United States Patent Office

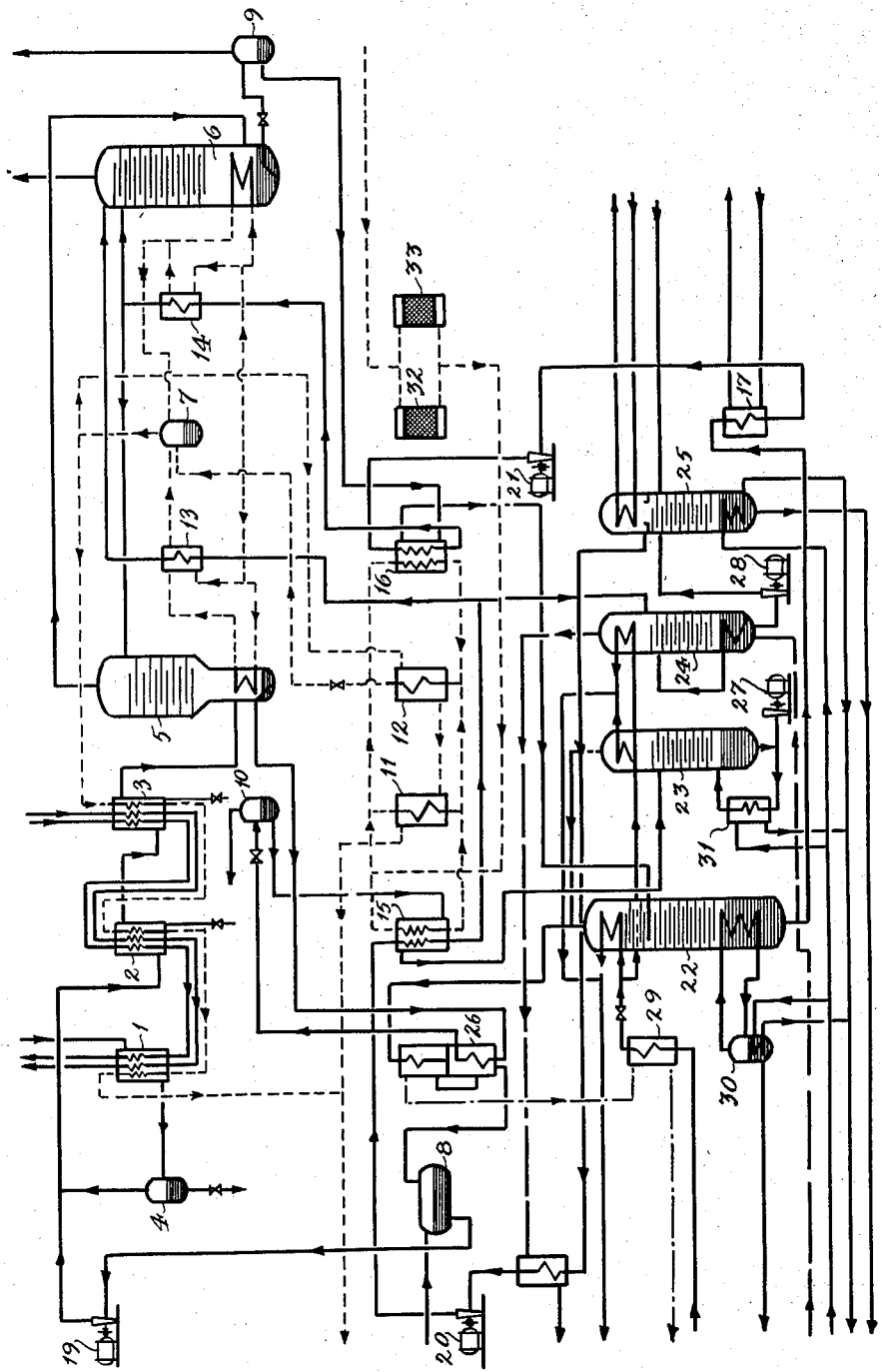

2,894,602
Patented July 14, 1959

2,894,602

SEPARATION OF ACETYLENE FROM METHANE CRACKING GASES BY MEANS OF A SELECTIVE SOLVENT

Giacomo Fauser, Novara, Italy, assignor to Montecatini Società Generale per l'Industria Mineraria e Chimica, a corporation of Italy Application February 23, 1956, Serial No. 567,400

Claims priority, application Italy September 24, 1955

2 Claims. (Cl. 183—120)

The present invention relates to an improved method of separating acetylene from methane cracking gases by means of a selective solvent, while operating under pressure and at low temperatures.

In U.S. patent application Serial No. 552,619 of December 12, 1955, now U.S. Patent No. 2,834,431, of which this application is a continuation-in-part, a process has been disclosed for the recovery of very pure acetylene from a gas mixture resulting upon partial combustion of methane. According to the said application, acetaldehyde is used as a selective solvent for acetylene and the process permits the simultaneous recovery of highly concentrated carbon dioxide as a secondary product. The operating cycle of the process comprises substantially the following steps:

(1) Compression of the raw gaseous mixture coming from the cracking unit, cooling the gaseous mixture in heat exchangers, in countercurrent with cold inert gases coming from a scrubbing and an absorption column.

(2) Addition of acetaldehyde to the compressed and cold gaseous mixture and introduction of the gaseous mixture at the bottom into a plate scrubbing and absorption column where it flows upwardly in countercurrent with the solvent entering at the top at a very low temperature about —80° C.).

(3) Absorption of the gases of the raw mixtures by the solvent within the column in two stages and removal of the inert gases by means of degassing.

(4) Processing of the solution obtained in the first stage (the solution containing higher acetylenes and several inert gases) by means of three plate fractionating columns where a separation between the solvent on the one hand and the gases and higher acetylenes on the other hand takes place, and whereupon the recovered solvent is recycled.

(5) Processing of the solution obtained in the second stage (containing acetylene and carbon dioxide) in a final degassing column in which acetylene and carbon dioxide (practically pure) are separated from the solvent which is recycled.

(6) Producing the low temperature in the main obsorption column and effectuating the cooling of the solvents recycled from the final column by means of an independent ethylene refrigerating cycle.

I have now found, and this is the object of the present invention, that the process described in the aforementioned patent application can be improved by using methanol, in lieu of acetaldehyde, as selective solvent, for both the removal of the higher acetylenes and for the separation and recovery of acetylene.

The novel features which I consider characteristic of my invention are set forth with particularity in the appended claims. The invention itself, however, and any additional objects and advantages thereof will best be understood from the following description when read in connection with the accompanying schematic drawing.

Employing, for example, the products of a cracking process consisting in a partial combustion of methane with oxygen in a homogeneous phase, resulting in a gaseous mixture having the following composition:

|  | Percent |
|---|---|
| $CO_2$ | 3.8 |
| CO | 25.2 |
| $C_2H_2$ | 8.6 |
| $H_2$ | 54.2 |
| $C_2H_4$ | 0.6 |
| $CH_4$ | 6.5 |
| $N_2$ | 0.5 |
| $O_2$ | 0.4 |
| Diacetylene | 0.08 |
| Methylacetylene, monovinylacetylene and ethylacetylene | 0.02 |
| Higher acetylenes, boiling above 64° | 0.1 |

This gaseous mixture is compressed to 13 atm. prior to entry into an acetylene scrubbing device, and is then decarbonated in the usual manner. By employing, for example, scrubbing methods utilizing ammonia solutions and then scrubbing with sodium hydroxide solutions, it is possible to lower the carbon dioxide content of the gas to as low as 10 p.p.m. In addition, this decarbonation also removes higher acetylenes boiling above 64° C. from the gas until the content thereof is reduced to, for example, 10 p.p.m.

Thus, the composition of the gaseous mixture at the inlet of the heat exchanger hereinafter described will be as follows:

| | | |
|---|---|---|
| $CO_2$ | p.p.m. | 10 |
| CO | percent | 26 |
| $C_2H_2$ | do | 8.95 |
| $H_2$ | do | 56.43 |
| $C_2H_4$ | do | 0.62 |
| $CH_4$ | do | 6.76 |
| $N_2$ | do | 0.52 |
| $O_2$ | do | 0.41 |
| Diacetylene | do | 0.085 |
| Methylacetylene, monovinylacetylene and ethylacetylene | do | 0.025 |
| Higher acetylenes, boiling above 64° C. | p.p.m. | 10 |

In addition, the gas at the inlet of heat exchanger 1 should have a temperature of about 25° C. at a pressure of 13 atm.

The heat exchanger 1 comprises four circuits and the raw gas is cooled therein to 3° to 4° C. in heat exchange with gases which pass through the other three circuits. These gases are: $H_2+CO$, residual gas, and ethylene; the first two come from the tail-gas fractionating column and the third is part of the ethylene refrigeration cycle; all three, prior to reaching heat exchanger 1, pass through heat exchangers 3 and 2 which also have four circuits each.

At the outlet of heat exchanger 1, condensed moisture is separated in separator 4 from the raw gas which then enters into heat exchanger 2. Prior to entry into 2, pump 19 injects methanol into the cycle as an antifreezing agent. In heat exchanger 2 the temperature of the raw gas is lowered to about —25° C., again at the expense of the three afore-mentioned gases. In heat exchanger 3 the temperature of the raw gas is further lowered in the same manner to about —70° to —80° C. It is to be noted that the raw gas passes upwardly through heat exchangers 2 and 3. A dehumidification of the gas takes place in these two heat exchangers, in that excess methanol injected into the conduit delivering the raw gas into heat exchanger 2 is withdrawn at the bottom of this heat exchanger at about 3° C. At this temperature, the raw gas is saturated with methanol. A small amount of methanol-condensate, formed because of the further temperature reduction in heat exchanger 2, flows downward, in opposite direction to the gas, while the larger portion flows with the gas on to heat exchanger 3, where it is separated on the bottom at about −25° C. Any moisture is thus practically eliminated at this point. A small portion of the methanol condensate resulting from the further temperature reduction in heat exchanger 3 flows back, in opposite direction to the gas, whereas most of the methanol passes with the gas into the first scrubbing column 5.

Significantly, the methanol taken off at the bottom of heat exchangers 2 and 3 contains in solution not only moisture condensate, but also most of the methylacetylene, monovinylacetylene and ethylacetylene as well as a small part of diacetylene of the raw gas mixture. For this reason, this methanol portion is not recovered. Moreover, the amounts thereof are, at least initially, practically negligible.

In column 5, all higher acetylenes (primarily diacetylene) that are still present in the raw gas are removed by scrubbing with a small amount of methanol (1st stage). Together with higher acetylenes, a small portion of $C_2H_2$ is also absorbed.

The methanol enters at the top and is discharged at the bottom of column 5. The absorption temperature of about −80° C. is maintained by a series of ethylene coolant coils mounted within the column. The raw gas, emerging at the top of column 5 practically free from all higher acetylenes, enters at the bottom of column 6 (second stage). Here, all the acetylene contained therein is absorbed by another scrubbing with methanol. Again, an absorption temperature of about −80° C. is maintained by means of a number of ethylene coolant coils, mounted within the column.

The methanol with the absorbed acetylene is discharged at the bottom of column 6, whereas at the top of this column there are two methanol inlets: one for regenerated methanol and the other for additional, new methanol. The temperatures of these scrubbing methanols are −80° C. and −85° C., respectively.

The tail gas, emerging from the top of column 6, has the following composition:

| | Percent |
|---|---|
| $H_2$ | 61.81 |
| CO | 28.85 |
| $N_2$ | 0.58 |
| $O_2$ | 0.50 |
| $CH_4$ | 7.71 |
| $C_2H_4$ | 0.55 |

This tail gas is transferred to a low temperature gas fractionating device where methane and ethylene (residual gases) are separated from $H_2$+CO. After compressing from 13 atm. to up to 250 atm., the latter fraction may be utilized for the synthesis of methanol or, after the conversion of carbon monoxide, for an ammonia synthesis.

This $H_2$+CO fraction has the folowing composition:

| | Percent |
|---|---|
| $H_2$ | 69.8 |
| CO | 28.7 |
| $N_2$ | 0.6 |
| $O_2$ | 0.4 |
| $CH_4$ | 0.5 |

The composition of the residual gas is as follows:

| | Percent |
|---|---|
| $CH_4$ | 63.5 |
| CO | 30.0 |
| $O_2$ | 1.3 |
| $C_2H_4$ | 4.8 |
| $N_2$ | 0.4 |

The low temperature of the residual gas and of the $H_2$+CO mixture (which emerge from the fractionating column at about −85° to −90° C.), is utilized, as previously set forth, in heat exchangers 3, 2 and 1. The methanol fraction having absorbed the higher acetylenes (1st stage), is transferred from the bottom of column 5 to a regenerating column 23. Prior to entering this column, the fraction is preheated in heat exchanger 26 at the expense of pure acetylene, being saturated with methanol at −26° C., and coming from the heads of column 22 and 23. The afore-mentioned methanol fraction is then decompressed from 13 atm. to about 1.4 atm. in separator 10, in order to remove $H_2$, CO and $CH_4$ which may be dissolved therein, and the degassed methanol fraction passes into a heat exchanger 15 provided with 3 circuits. There it is further preheated, up to about 0° C., in heat exchange with rectified methanol passing to column 6 and with a part of the heated ethylene coolant coming under pressure from driers 32 and 33, placed at the pressure side of the ethylene compressor.

The operating conditions of regenerating column 23 are:

| | |
|---|---|
| Temperature at the top | °C −26 |
| Temperature at the bottom | °C +70 |
| Pressure | atm 1.4 |

The temperature of −26° C. at the top of column 23 is maintained by cooling with ammonia, and the temperature of +70° C. at the bottom by indirect heating with steam in reboiler 31.

In column 23 a separation takes place between the methanol and the acetylene dissolved therein. The acetylene, discharged at the top of this column, is mixed with the acetylene portion discharged from column 22. Therefore it is saturated with methanol at −26° C.

The methanol containing higher acetylenes, which is discharged at the bottom of column 23, is forced by pump 27 into column 24. Before it enters into the body of said column, it gives up some of its heat to the methanol collecting at the bottom of said column. Actually, the heat exchange takes preferably place through the walls of a coil incorporated in the bottom of 24. The operating conditions of the regenerating column 24 are the following:

| | |
|---|---|
| Temperature at the top | ° C −26 |
| Temperature at the bottom | ° C +27 |
| Pressure | atm 1.2 |

The temperature at the top is adjusted by cooling with evaporating ammonia; that at the bottom, as already stated, by means of a heat transfer from the methanol entering from 23.

In column 24, the higher acetylenes having a boiling point lower than that of methanol are completely removed by stripping, for example, with nitrogen. Nitrogen and higher acetylenes emerge from column 24 at −26° C. saturated with methanol vapors. The low temperature thereof is transferred in heat exchanger 18 to rectified methanol on its way to enter at the top of column 6.

The methanol discharged at the bottom of column 24 is forced by pump 28 into column 25 for a further purification by scrubbing with water and simultaneous rectification.

The last traces of higher acetylenes and hydrocarbons which may be still present as well as any solid polymers that may perhaps have formed, are eliminated together with the water which is withdrawn from the bottom of column 25. The bottom of the column is heated by means of a steam coil.

The methanol is condensed at the top of the column by means of a water-operating, refluxing condenser. Rectified methanol is withdrawn from one of the last plates of the column.

The operating conditions of column 25 are as follows:

| | |
|---|---|
| Temperature at the top | About 20–30° C. |
| Temperature at the bottom | About 105° C. |
| Pressure | 1.2 atm. |

Rectified methanol, discharged from column 25, passes through the heat exchanger 18, where part of its heat is transmitted to the gases emerging from column 24. By means of pump 20, the cooled methanol is passed through heat exchanged 15 and, finally, after cooling to —85° C. in cooler 13 of the ethylene cooling system, is entered on top of column 6.

Having absorbed acetylene (2nd stage), and flowing from column 6, the methanol is sent to the regenerating column 22. Prior to entering this column, the pressure is reduced from 13 atm. to 1.2 atm. in separator 9 so that $H_2+CO+CH_4$ which may possibly be dissolved therein, can be separated. Thereafter, the methanol passes through the heat exchanger 16 where it is preheated by a heat exchange in countercurrent with methanol returning from column 22 and with a part of heated ethylene under pressure which comes from driers 32 and 33.

The operating conditions of column 22 are as follows:

Temperature at the top _____ ° C__ —26
Temperature at the bottom _____ ° C__ +68
Pressure _____atm__ 1.2

The temperature at the top is maintained by cooling with evaporating ammonia, that at the bottom by indirect heating with steam in a reboiler 30, connected with the bottom of column 22 by means of a coil inserted in the latter. Condensing oil vapors, which are reevaporated in reboiler 30, are passed through this coil.

Thus, column 22 serves to separate the acetylene which has been absorbed by the methanol in column 6. Acetylene taken off at the top of column 22 is mixed, as previously mentioned, with another acetylene portion coming from column 23. The acetylene is therefore saturated with methanol at —26° C. This methanol is separated and recovered in heat exchanger 26 by means of additional cooling; the required low temperature is supplied, as previously set forth, by methanol coming from column 5.

The methanol separated in 26 is collected in a storage tank 8 from which it is drawn by means of pump 19 which serves to furnish the methanol for the entire cycle. In heat exchanger 29 the acetylene absorbs the heat of liquid ammonia provided for one of the refrigerating cycles. The composition of concentrated acetylene obtained at the end of the process is as follows:

| | Percent |
|---|---|
| $C_2H_2$ | 98.3 |
| $C_2H_4$ | 1.4 |
| $CH_4$ | 0.2 |
| $H_2+CO$ | 0.1 |

Regenerated methanol, free from acetylene, taken off at the bottom of column 22, passes through cooler 17 where it is cooled with water. From there it is transferred by a pump 21 to the previously described heat exchanger 16 where it is precooled, to be finally cooled to —80° C. in the evaporating ethylene cooler 14.

As in the patent application previously referred to, the present system uses two refrigerating cycles, one being an ammonia cycle provided to cool the heads of columns 22, 23 and 24, and the other being an ethylene cycle provided to furnish the low scrubbing temperature.

As previously stated, part of the liquid ethylene cycle coming from gel driers 32 and 33 is cooled in heat exchangers 15 and 16. The remaining part is cooled in heat exchanger 11 by means of an aliquot of the gaseous acetylene going back to the suction end of the compressor. The combined fractions are then passed to heat exchanger 12, where they are subcooled by means of part of the gaseous ethylene coming from the top of the feeding tank 7. The gaseous ethylene leaving heat exchanger 12 is then passed to heat exchanger 11. Ethylene coming from heat exchanger 12 is expanded in tank 7 which feeds the coils inserted in columns 5 and 6 as well as in coolers 13 and 14. Thus, part of the evaporated ethylene collecting at the top of feeding tank 7 passes through heat exchangers 11 and 12 while the remainder passes through exchangers 3, 2 and 1, whereupon the two fractions are combined and sent to the suction side of the thylene compressor.

As far as the requirements of methanol as a solvent are concerned, based on every 1000 $Nm.^3$ of gas to be scrubbed, measured at the intake of heat exchanger 1, the following amounts are required:

| | Litres |
|---|---|
| Newly added methanol at the top of column 6 | About 100 |
| Regenerated methanol at the top of columns 5 and 6 | About 1000 |
| Methanol for dehydration purposes at heat exchanger 2 | About 4 |

The methanol losses, based on each 1000 $Nm.^3$ of gas to be scrubbed amount to about 8 litres.

I claim:

1. The improvement in a process for the separation and recovery of pure acetylene from a gaseous mixture obtained upon partial combustion of methane and comprising $C_2H_2$, $H_2$ and CO as major constituents and $CO_2$, $C_2H^4$, $CH_4$, $N_2$, $O_2$ and higher acetylenes as minor constituents, said improvement comprising compressing the gaseous mixture to about 13 atm. at about 25° C., scrubbing with ammonia and sodium hydroxide solutions to substantially remove $CO_2$ and higher acetylenes, boiling above 64° C., cooling the compressed gaseous mixture to 3° to 4° C. in a first heat exchange, removing condensed moisture, adding methanol, cooling to —25° C. in a second heat exchange, separating methanol in excess of the saturation point and therewith additional moisture, methylacetylene, monovinylacetylene, ethylacetylene and some diacetylene, cooling to —70° to —80° C. in a third heat exchange, removing all remaining higher acetylenes and part of the acetylene in a first scrubbing step with methanol at about —80° C., absorbing all of the remaining acetylene in a second scrubbing step using regenerated methanol at about —80° C. and a portion of newly added methanol at about —85° C., fractionating the resulting tail gas comprising $H_2$, CO, $CH_4$ and small amounts of $N_2$, $O_2$ and $C_2H_4$, utilizing the low temperature of the $H_2$ and CO fraction and of the residual gases in said three heat-exchanges, compressing the $H_2$ and CO fraction to about 250 atm. for methanol synthesis, preheating the methanol fraction containing all higher acetylenes and part of the acetylene obtained from said first scrubbing step to —26° C. in a heat exchange with recovered acetylene saturated with methanol, decompressing said methanol fraction from 13 atm. to about 1.4 atm. to remove $H_2$, CO and $CH_4$ which may be dissolved therein, further preheating said methanol fraction to about 0° C., regenerating said methanol fraction by exposing to heat of 70° C., removing and recovering vaporized acetylene, cooling the methanol fraction which still contains the higher acetylenes to about 27° C., stripping with nitrogen of about —26° C. to completely remove higher acetylenes having a boiling point lower than methanol, further purifying said methanol fraction by scrubbing with water and simultaneously rectifying, cooling the regenerated methanol to —80° C. and using it in said second scrubbing step wherein all of the acetylene is absorbed, reducing the pressure of the methanol solution obtained from said second scrubbing step to about 1.2 atm. to separate $H_2$, CO and $CH_4$ which may have been dissolved therein, preheating said methanol solution, separating and recovering acetylene and combining with acetylene separated and recovered from said methanol fraction obtained from said first scrubbing step.

2. The improvement in a process for the separation and recovery of pure acetylene from a gaseous mixture obtained upon partial combustion of methanol according to claim 1, whereby the low temperatures required in said two scrubbing steps are furnished by an ethylene refrigerating cycle, and the low temperatures required in said separation and recovery of acetylene and said stripping with nitrogen for the separation of higher acetylenes are furnished by an ammonia refrigerating cycle.

References Cited in the file of this patent

UNITED STATES PATENTS

| | | |
|---|---|---|
| 1,942,131 | Baumann et al. | Jan. 2, 1934 |
| 2,013,996 | Baumann et al. | Sept. 10, 1935 |
| 2,714,940 | Milligan | Aug. 9, 1955 |
| 2,726,734 | Nirenberg | Dec. 13, 1955 |
| 2,733,259 | De Croes et al. | Jan. 31, 1956 |
| 2,753,012 | Thodos et al. | July 3, 1956 |

OTHER REFERENCES

Fieser & Fieser: Organic Chemistry, Heath & Co., 1950, p. 120.